(12) United States Patent
Feng et al.

(10) Patent No.: US 12,249,277 B2
(45) Date of Patent: Mar. 11, 2025

(54) SYSTEM ON CHIP AND DISPLAY DEVICE

(71) Applicant: SHENZHEN TCL NEW TECHNOLOGY CO., LTD., Guangdong (CN)

(72) Inventors: Lin Feng, Guangdong (CN); Yikai Chen, Guangdong (CN)

(73) Assignee: SHENZHEN TCL NEW TECHNOLOGY CO., LTD., Guangdong (CN)

(*) Notice: Subject to any disclaimer, the term of this patent is extended or adjusted under 35 U.S.C. 154(b) by 3 days.

(21) Appl. No.: 18/589,431

(22) Filed: Feb. 28, 2024

(65) Prior Publication Data

US 2024/0339075 A1   Oct. 10, 2024

Related U.S. Application Data

(63) Continuation of application No. PCT/CN2023/101531, filed on Jun. 20, 2023.

(30) Foreign Application Priority Data

Apr. 4, 2023  (CN) .................. 202310371108.0

(51) Int. Cl.
*G09G 3/3225*    (2016.01)
*G06T 7/00*      (2017.01)

(52) U.S. Cl.
CPC ......... *G09G 3/3225* (2013.01); *G06T 7/0002* (2013.01); *G06T 2207/30168* (2013.01)

(58) Field of Classification Search
CPC ........ G06T 7/0002; G06T 2207/30168; G09G 3/3225
See application file for complete search history.

(56) References Cited

U.S. PATENT DOCUMENTS 9,001,194 B2 * 4/2015 Yabui ................ G02B 30/25
                                                  348/54
10,733,702 B2 * 8/2020 Kim .................. G06T 3/4007
(Continued)

FOREIGN PATENT DOCUMENTS

CN    102396238 A    3/2012
CN    109754740 A    5/2019
(Continued)

OTHER PUBLICATIONS

International Search Report in International application No. PCT/CN2023/101531,mailed on Jan. 4, 2024.
(Continued)

*Primary Examiner* — Michael Pervan
(74) *Attorney, Agent, or Firm* — PV IP PC; Wei Te Chung

(57) ABSTRACT

The present disclosure provides an system on chip and a display device. The system on chip includes a shared storage unit, a micro-processing unit, a display calibration unit, and an image processing unit. In response to a calibration instruction, the display calibration unit obtain image sampling data in the shared storage unit to perform a compensation computation operation and generate optical compensation data. In response to a display instruction, the image processing unit obtains display configuration data and the optical compensation data in the shared storage unit to perform a picture compensation operation.

20 Claims, 3 Drawing Sheets

(56) References Cited

U.S. PATENT DOCUMENTS

| | | | |
|---|---|---|---|
| 10,984,730 B2* | 4/2021 | Han | G06F 3/0412 |
| 2012/0050505 A1* | 3/2012 | Yabui | G03B 35/20 |
| | | | 348/54 |
| 2019/0026861 A1* | 1/2019 | Kim | G09G 3/3208 |
| 2019/0130845 A1* | 5/2019 | Han | G09G 3/3266 |
| 2022/0208067 A1* | 6/2022 | Heo | G09G 5/10 |

FOREIGN PATENT DOCUMENTS

| | | |
|---|---|---|
| CN | 111341264 A | 6/2020 |
| CN | 114265568 A | 4/2022 |
| CN | 114360461 A | 4/2022 |
| CN | 114694574 A | 7/2022 |
| CN | 115713917 A | 2/2023 |
| TW | 201413700 A | 4/2014 |

OTHER PUBLICATIONS

Written Opinion of the International Search Authority in International application No. PCT/CN2023/101531,mailed on Jan. 4, 2024.

* cited by examiner

SYSTEM ON CHIP AND DISPLAY DEVICE

CROSS-REFERENCE TO RELATED APPLICATIONS

This application is a continuation of International Application No. PCT/CN2023/101531, filed on Jun. 20, 2023, which claims priority to Chinese Patent Application No. 202310371108.0, filed on Apr. 4, 2023. The disclosures of the above applications are incorporated herein by reference in their entireties.

TECHNICAL FIELD

The present disclosure relates to display device technologies, and more particularly, to a system on chip and a display device.

BACKGROUND

Organic Light Emitting Diodes (OLEDs) are active light-emitting devices, which offer many advantages such as high colours, wide viewing angles, high contrasts, high response speeds, thin bodies, and low power consumptions. The OLEDs have been applied to display screens of terminal display products such as mobile phones, tablets, and televisions.

The OLED terminal display products often adopt a system solution architecture that uses a front-end signal processing board (system on chip, SoC) to process input signals, user operations, and the like. The processed signals are sent to an independent T-Con board for screen-lighting signal processing and calibration, then the screen-lighting signal is sent to a display panel for display. However, generally, units on the signal processing board and T-Con board are configured according to their respective maximum needs, and the signal processing board and the T-Con board cannot share resources, which will likely to result in waste of internal resources and increase architecture cost.

SUMMARY

The present disclosure provides a system on chip for connection with an active light-emitting display panel. The system on chip includes:
- a shared storage unit configured to store image sampling data, display configuration data, and optical compensation data;
- a micro-processing unit connected to the shared storage unit, wherein the micro-processing unit is configured to receive a control signal and output a control instruction in response to the control signal to trigger enablement of the shared storage unit, the control instruction including one of a display instruction and a calibration instruction;
- a display calibration unit connected to the micro-processing unit, wherein the display calibration unit is configured to, in response to the calibration instruction, obtain the image sampling data in the shared storage unit to perform a compensation computation operation and generate the optical compensation data; and
- an image processing unit connected to the micro-processing unit, wherein the image processing unit is configured to, in response to the display instruction, obtain the display configuration data and the optical compensation data in the shared storage unit to perform a picture compensation operation.

The present disclosure further provides a display device including a system on chip as described above and an active light-emitting display panel that are connected to each other.

BRIEF DESCRIPTION OF THE DRAWINGS

The technical solutions and other beneficial effects of the present disclosure will be apparent through a detailed description of the specific embodiments of the present disclosure in conjunction with the accompanying drawings.

DETAILED DESCRIPTION

The technical solutions of the embodiments of the present disclosure will be clearly and completely described below with reference to the accompanying drawings in these embodiments. Obviously, the described embodiments are only some of the embodiments of the present disclosure, but not all of the embodiments. Based on the embodiments in the present disclosure, all other embodiments obtained by those skilled in the art without making creative efforts fall within the protection scope of the present disclosure.

It should be understood that, in the description of the present disclosure, the features limited by the terms "first" and "second" may explicitly or implicitly include one or more of the described features. In the description of the present disclosure, "plurality" means two or more, unless otherwise explicitly and specifically limited. It should be noted that, unless otherwise clearly stated and limited, the terms "interconnect" and "connect" should be understood in a broad sense. For example, they can be a direct connection, an indirect connection through an intermediate medium, or an internal connection between two components or an interaction between two components. For those of ordinary skill in the art, the specific meanings of the above terms in the present disclosure can be understood according to specific circumstances.

The following disclosure provides many different embodiments or examples for implementing the various structures of the present disclosure. To simplify the disclosure of the present disclosure, the components and arrangements of specific examples are described below. Of course, they are merely examples and are not intended to limit the present disclosure. Furthermore, the present disclosure may repeat reference numbers and/or reference letters in different embodiments, and such repetition is for simplicity and clarity and does not by itself indicate a relationship between the various embodiments and/or arrangements discussed. In addition, the present disclosure provides examples of various specific processes and materials, but one of ordinary skill in the art will recognize the application of other processes and/or the use of other materials.

Embodiments of the present disclosure provide a system on chip and a display device, which are described in detail below.

Figure 1:
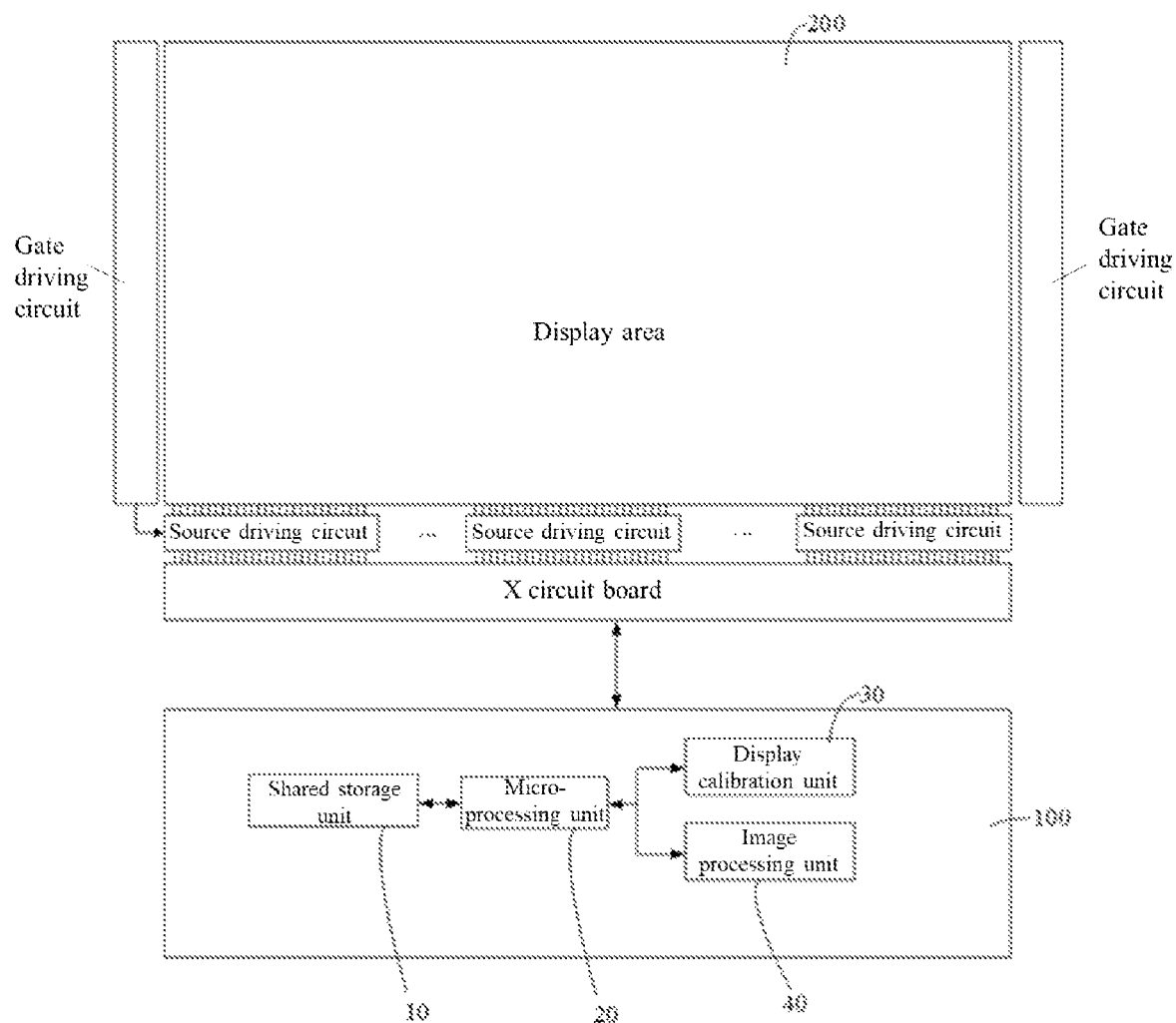
FIG. 1 is a schematic structural diagram of a display device according to some embodiments of the present disclosure.

Please refer to FIG. 1, some embodiments of the present disclosure provide a display device, including an active light-emitting display panel 200 and a system on chip 100 that are connected to each other.

The active light-emitting display panel 200 may include an active light-emitting display panel 200 such as an organic light-emitting diode (OLED) panel, a quantum dot light-emitting diode (QLED) panel, or a micro-light-emitting diode/mini-light-emitting diode (Micro-LED/Mini-LED) panel. The embodiments of the present disclosure do not limit a specific type of the active light-emitting display panel 200.

The embodiments of the present disclosure do not specifically limit the application of the display device, which can be a handheld device (e.g., a smartphone, a tablet computer), a wearable device (e.g., a smart bracelet, a wireless headset, a smart watch, smart glasses), a vehicle-mounted device, (e.g., a navigator, a parking assist system, a dashcam, a vehicle refrigerator), a virtual reality (VR) equipment, an augmented reality (AR) equipment, a Terminal Device, etc., and are not limited here.

To better implement the display device of the present disclosure, the following embodiments introduce the system on chip 100. Please continue to refer to FIG. 1. Some embodiments of the present disclosure provide the system on chip 100 to be connected to the active light-emitting display panel 200. The active light-emitting display panel 200 may be for example, an OLED display panel 200, a QLED display panel 200, or a Micro-LED/Mini-LED display panel 200.

In some embodiments of the present disclosure, a timing controller (TCON) is integrated in the system on chip 100. This type of motherboard is usually referred to as a TCON-LESS motherboard for short. Therefore, in some embodiments of the present disclosure, the system on chip 100 can provide data signals and driving signals to the display panel 200 through the TCON. The system on chip in the embodiments of the present disclosure may be the system on chip 100 based on at least one or at least one type of micro-processing unit and a storage unit. It should be noted that the system on chip 100 may also be configured with an operating system.

The system on chip 100 in the embodiments of the present disclosure includes a shared storage unit 10, a micro-processing unit 20, a display calibration unit 30, and an image processing unit 40.

The shared storage unit 10 is configured to store image sampling data, display configuration data, and optical compensation data. The shared storage unit 10 is a unit with data storage capabilities, including but not limited to a random access memory (RAM) 11, a read-only memory (ROM), an electrically erasable programmable read-only memory (EEPROM), and a flash memory (FLASH).

The micro-processing unit 20 is connected to the shared storage unit 10. The micro-processing unit 20 is configured to receive a control signal and output a control instruction in response to the control signal to trigger enablement of the shared storage unit 10. The control instruction includes one of a display instruction and a calibration instruction.

The display calibration unit 30 is connected to the micro-processing unit 20. The display calibration unit 30 is configured to, in response to the calibration instruction, obtain the image sampling data in the shared storage unit to perform a compensation computation operation and generate the optical compensation data.

The image processing unit 40 is connected to the micro-processing unit 20. The image processing unit 40 is configured to, in response to the display instruction, obtain the display configuration data and the optical compensation data in the shared storage unit to perform a picture compensation operation.

The display calibration unit 30 and the image processing unit 40 in the embodiments of the present disclosure are used to provide display picture compensation for the active light emitting display panel 200. The display configuration data may include at least one of the data of brightness, contrast, resolution, etc.

The system on chip 100 is configured to be connected to the active light-emitting display panel 200. The system on chip 100 is configured to include the micro-processing unit 20, and the shared storage unit 10, the display calibration unit 30, and the image processing unit 40 that are respectively connected to the micro-processing unit 20. The shared storage unit 10 is configured to store the image sampling data, the display configuration data, and the optical compensation data. The micro-processing unit 20 is configured to receive the control signal and output the control instruction in response to the control signal to trigger the enablement of the shared storage unit 10. The control instruction includes one of the display instruction and the calibration instruction. The display calibration unit 30 is configured to, in response to the calibration instruction, obtain the image sampling data in the shared storage unit to perform the compensation computation operation and generate the optical compensation data. The image processing unit 40 is configured to, in response to the display instruction, obtain the display configuration data and the optical compensation data in the shared storage unit to perform the picture compensation operation. Since the display calibration unit 30 and the image processing unit 40 are respectively controlled by the control instructions output by the micro-processing unit 20, the micro-processing unit 20 will not output the calibration instruction when the image processing unit 40 is performing the picture compensation operation, and the resources of the shared storage unit 10 may be allocated to the image processing unit 40; and the micro-processing unit 20 will not output the display instruction, when the display calibration unit 30 is performing the compensation computation operation, and the resources of the shared storage unit 10 may be allocated to the display calibration unit 30. In this way, the resources of the shared storage unit 10 are dynamically scheduled and controlled, such that it is possible to make full use of the resources of the shared storage unit 10 and realize dynamic adjustment, which is conducive to simplifying an architecture of the system on chip 100 and reducing hardware cost.

Figure 2:
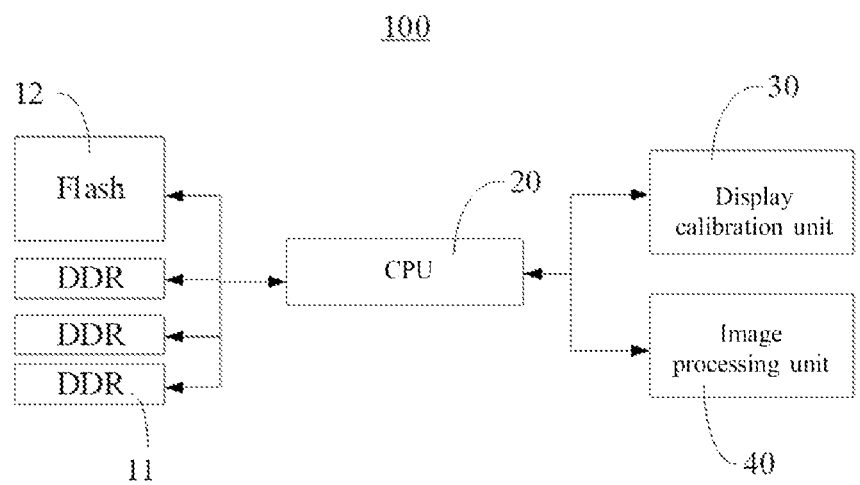
FIG. 2 is a schematic structural diagram of a system on chip according to some embodiments of the present disclosure.

In some embodiments, as shown in FIG. 2, the shared storage unit 10 includes at least one random access memory (RAM) 11 connected to the micro-processing unit 20. The RAM 11 is used to provide a caching function when the system is running. For example, when the display calibration unit 30 generates the optical compensation data, various generated data signals can be cached through the random access memory 11. When the display calibration unit 30 performs the calibration operation, the received and parsed frame each are sent to the random access memory 11 to be cached on the time sequence, then a corresponding image signal is read from the random access memory 11, and then the optical compensation data is generated by analysing the corresponding image signal according to a preset compensation algorithm and is cached in the random access memory 11. Correspondingly, the image processing unit 40 may read the corresponding optical compensation data from the random access memory 11 and then process the data.

Specifically, the random access memory 11 may include but is not limited to a Synchronous Dynamic Random-Access Memory (SDRAM), a Double Data Rate Synchronous Dynamic Random Access Memory (DDR) 11, etc.

The micro-processing unit 20 of the embodiments of the present disclosure is configured to release the random access memory 11 when the display calibration unit 30 finishes the compensation computation operation or when the image processing unit 40 finishes the picture compensation operation.

Specifically, taking the DDR as an example of the random access memory 11 of the embodiments of the present disclosure, when the display panel 200 is in a normal display state, that is, when the image processing unit 40 performs the picture compensation operation, the computation requirement on the micro-processing unit 20 is 0.2 tera operations per second (TOPS) for signal processing and 0.4 TOPS for the display calibration unit 30, and the bandwidth requirement on the DDR is 40 Gigabits per second (Gbps) for signal processing and 20 Gbps for the display calibration unit 30. When picture calibration is performed, that is, when the image processing unit 40 performs the compensation computation operation, the computation performance requirement on the micro-processing unit 20 is 1 TOPS and the bandwidth requirement on the DDR is 120 Gbps. At this time, the signal processing related to the picture compensation operation can be suspended, so the computation performance requirement and the bandwidth requirement on the DDR for the image processing unit 40 is ignored. As mentioned above, it can be concluded that such system configuration with a computing power requirement of 1Tops and a DDR bandwidth of 120 Gbps may support normal operations of the system. In this way, the resources of the shared storage unit 10 may be dynamically scheduled and controlled, so that the resources of the storage unit 10 are fully utilized and dynamically adjusted, which is beneficial to simplifying the architecture of the system on chip 100 and reducing the hardware cost.

In some embodiments, please continue to refer to FIG. 2, the shared storage unit 10 further includes a non-volatile memory 12, and the non-volatile memory 12 and the random access memory 11 are respectively connected to the micro-processing unit 20. The non-volatile memory 12 is configured to store configuration parameters and other data in the event of a power failure of the system.

The non-volatile memory 12 in the embodiments of the present disclosure is configured to store the image sampling data, the display configuration data, and the optical compensation data. The non-volatile memory 12 has the capacity that data will not be lost when the system is restarted after a power loss.

For example, the display calibration unit 30 obtains optical data (e.g., brightness data, driving voltage data) of each pixel in each frame of image from the image sampling data, and then analyses and processes the optical data according to a preset optical compensation algorithm to generate data which can be called by the micro-processing unit 20, to be written into the non-volatile memory 12.

Taking a FLASH as an example of the non-volatile memory 12 in the embodiments of the present disclosure, the optical compensation data is stored in the FLASH. When the image processing unit 40 performs the picture compensation operation, the micro-processing unit 20 may copy the optical compensation data from the FLASH to the random access memory 11 that can be read at high speed, and continuously refresh the data per frame. Based on this, the image processing unit 40 obtains an actual gray level of each pixel for display, that is, compensated data is generated for processing of the image sampling data and sent to the display panel 200 for display.

In some embodiments of the present disclosure, the non-volatile memory 12 may include, but is not limited to, an ROM, an EEPROM, and a FLASH.

The micro-processing unit 20 is configured to retrieve the display configuration data into the random access memory 11 when receiving a display control signal and to retrieve the optical compensation data into the random access memory 11 when receiving a calibration control signal.

In some embodiments, the non-volatile memory 12 includes a first storage area and a second storage area. The display configuration data is stored in the first storage area, and the image sampling data and the display configuration data are stored in the first storage area and the second storage area.

The embodiments of the present disclosure divide, based on the storage capacity and the storage bandwidth of the non-volatile memory 12 and the storage capacity and the storage bandwidth required by each operating unit, the non-volatile memory 12 into a plurality of storage spaces corresponding to the respective operating unit. In this way, the storage space and bandwidth of the storage unit can be dynamically managed and controlled, thereby realizing management of sharing and scheduling, which is conducive to ensuring bandwidth utilization of the cache of the non-volatile memory 12, to fully utilize the storage space and the bandwidth of the non-volatile memory 12, realize dynamic adjustment, and reduce storage cost of the non-volatile memory 12.

In some embodiments, the display calibration unit 30 is further configured to receive image sampling data and generate the optical compensation data based on the image sampling data and the preset compensation algorithm.

The display calibration unit 30 is configured to receive the image sampling data, that is, the initial display data, from the active light-emitting display panel 200. The image sampling data includes a grayscale of each pixel derived from an image to be displayed. The display calibration unit 30 determines a grayscale for each pixel and generates the optical compensation data according to the preset compensation algorithm.

For example, the optical compensation for the active light-emitting display panel 200 is to compensate and eliminate Mura appearing in the display panel 200. That is, the preset compensation algorithm may be a De Mura compensation algorithm, which specifically may include a colour shift compensation algorithm, a brightness compensation algorithm, etc. In some embodiments of the present disclosure, the preset De Mura compensation algorithm may be written into the shared storage unit 10 of the system on chip 100. When the optical compensation needs to be performed for the display panel 200, the stored De Mura compensation algorithm is called to compute and obtain the optical compensation data.

In some embodiments, the system on chip further includes a compensated data extraction unit 60 connected to the micro-processing unit 20. The compensated data extraction unit 60 is configured to receive the initial picture data in response to the display instruction, perform a picture compensation operation based on the initial picture data, the display configuration data, and the optical compensation data to generate compensated picture data, and send the compensated picture data to the active light-emitting display panel 200 for display.

Specifically, taking brightness compensation as an example, this compensation technology first detects the unevenness of a display image of the display panel 200 to form the image sampling data. The image sampling data is equivalent to a historical file of the corresponding display panel 200 and reflects physical properties of the display panel 200. Then, the image sampling data is transferred to the display calibration unit 30, and undergoes a compensation computation processing to form the optical compensation data. The image processing unit 40 reads the optical compensation data and performs computation based on the display configuration data to adjust the grayscales. For example, for a position which is originally too bright, a grayscale of the corresponding image data is reduced and new image data (i.e., compensated grayscale data) is output, or, for a position which is originally too dark, a grayscale of corresponding image data is increased and new image data (i.e., compensated grayscale data) is output. In this way, brightness of the pixel is changed to achieve a compensation effect of uneven brightness, and information of an output terminal of the display panel 200 is transmitted back to an input terminal thereof, through which information of the input terminal is corrected, finally realizing dynamic balance.

Figure 3:
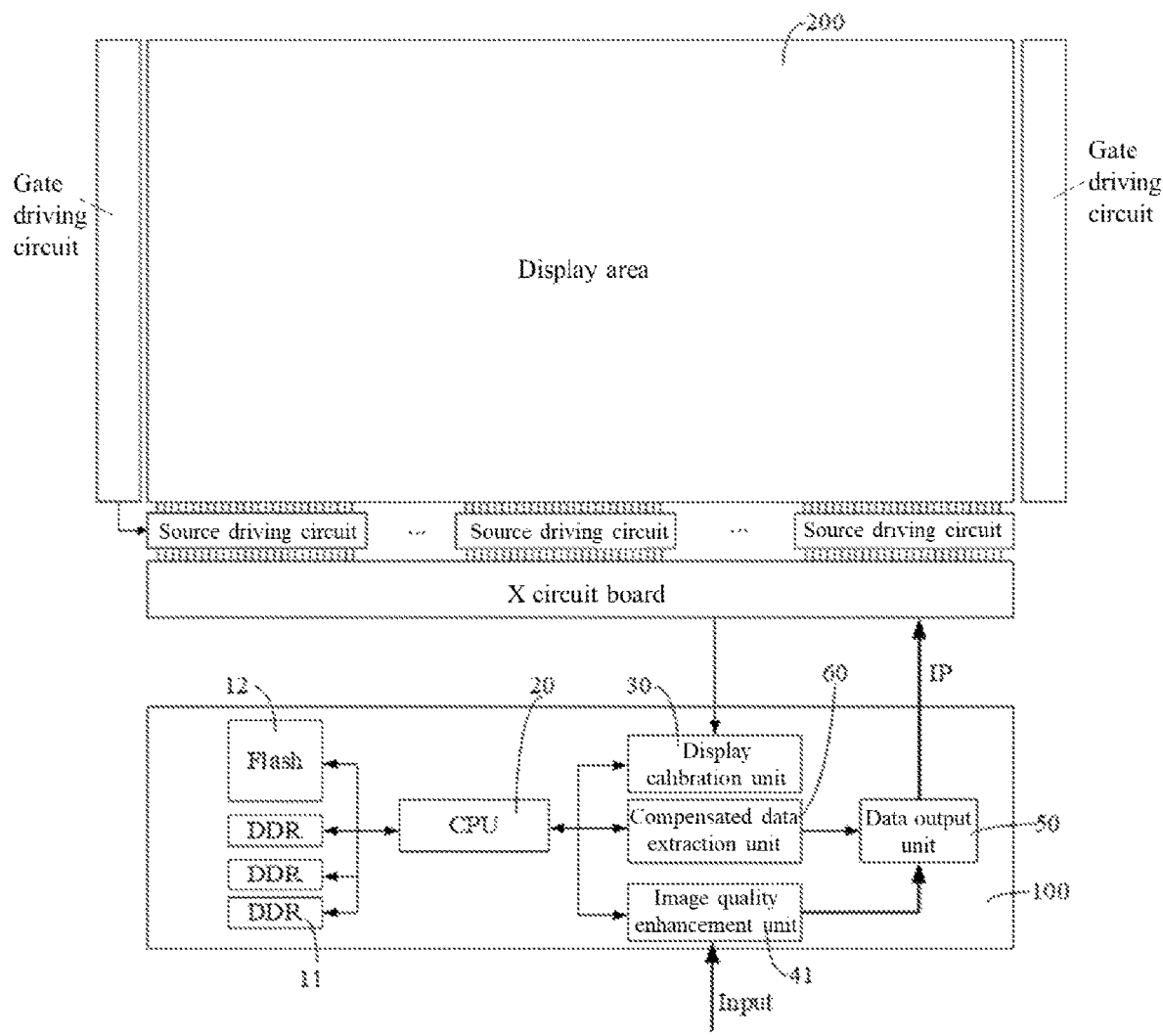
FIG. 3 is a schematic structural diagram of another system on chip according to some embodiments of the present disclosure.

In some embodiments, as shown in FIG. 3, the image processing unit 40 further includes an image quality enhancement unit 41 connected to the micro-processing unit 20. The image quality enhancement unit 41 is configured to superimpose image quality enhancement data to the compensated picture data in response to a received image quality enhancement trigger instruction.

In some embodiments, the micro-processing unit 20 is further configured to receive one of the display control signal and the calibration control signal, and outputs a display instruction in response to the display control signal or outputs a calibration instruction in response to the calibration control signal. In some embodiments of the present disclosure, the display control signal and the calibration control signal are mutually exclusive control signals, so that the micro-processing unit 20 will not receive the display control signal and the calibration control signal at the same time, ensuring that the picture compensation operation and the optical compensation computation operation are mutually exclusive operations, thereby ensuring that the image processing unit 40 performs the picture compensation operation and the display calibration unit 30 performs the picture compensation operation without interfering with each other, which is conducive to realizing resource sharing.

The control signal includes the display control signal and the calibration control signal. Correspondingly, in some embodiments of the present disclosure, the micro-processing unit 20 includes a first sub-micro-processing unit 21 and a second sub-micro-processing unit 22.

Figure 4:
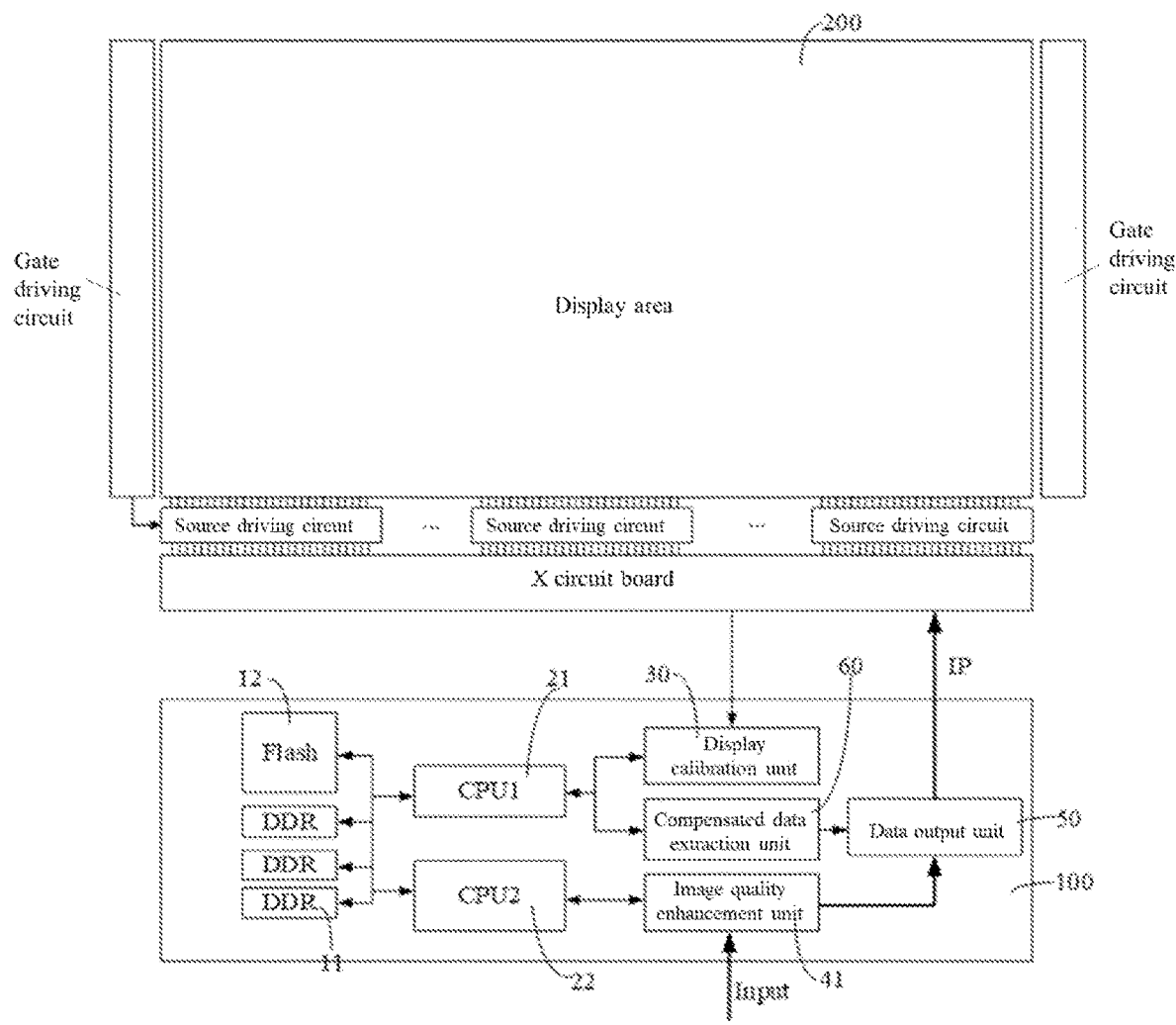
FIG. 4 is a schematic structural diagram of another system on chip according to some embodiments of the present disclosure.

Specifically, as shown in FIG. 4, the first sub-micro-processing unit 21 is connected to the shared storage unit 10, the display calibration unit 30, and the compensated data extraction unit 60. The first sub-micro-processing unit 21 is configured to receive the calibration control signal and send the calibration instruction to trigger the enablement of the shared storage unit 10 in response to the calibration control signal. The second sub-micro-processing unit 22 is connected to the shared storage unit 10 and the image quality enhancement unit 41. The second sub-micro-processing unit 22 is configured to receive the display control signal and send the display instruction to trigger the enablement of the shared storage unit 10 in response to the display control signal.

The first sub-micro-processing unit 21 and the second sub-micro-processing unit 22 may be the same micro-processing unit, or may be different micro-processing units 20. Specifically, the micro-processing unit 20 in the embodiments of the present disclosure may include, but is not limited to, a processor of a Microcontroller Unit (MCU) 20, of a digital signal processor (DSP), of a Micro Processor Unit (MPU), or of a central micro-processing unit (CPU), etc.

It should be noted that the above-mentioned micro-processing unit 20 may be a device, a chip, or the like, that includes the micro-processing unit 20. For example, the micro-processing unit 20 system may have an operating system based on the micro-processing unit 20. For example, a system of the micro-processing unit 20 may be an embedded system based on the micro-processing unit 20. For example, the micro-processing unit 20 system may be a multi-processor system including at least two types of or two of the above micro-processing units 20. For example, data may be exchanged between various processors or micro-processing units 20. The micro-processing units 20 can share an input/output (I/O) device, a controller, an external device, etc. The micro-processing units 20 may be respectively controlled by different operating systems or be controlled by a unified operating system. The micro-processing units 20 may be controlled by different control logic (e.g., firmware control algorithms). In addition, the micro-processing units 20 may control different processes in parallel or control each process serially. The embodiments of the present disclosure do not limit the micro-processing unit.

In some embodiments, please refer to FIG. 3 or FIG. 4, the system on chip 100 further includes a data output unit 50 connected to the image quality enhancement unit 41 and the compensated data extraction unit 60. The data output unit 50 encodes and outputs the data received from the image quality enhancement unit 41 or the compensated data extraction unit 60 to the active light-emitting display panel 200.

The data output unit 50 is configured to realize communication and transmission between the image quality enhancement unit 41 and the active light-emitting display panel 200 by using a display signal interface protocol (IP), to realize a picture display of the active light-emitting display panel 200.

Taking a Point to Point (P2P) interface protocol as an example, the data output unit 50 is configured to obtain a type identification signal transmitted by the image quality enhancement unit 41 or the compensated data extraction unit 60, identify a corresponding P2P interface type based on the type identification signal, and transmit corresponding P2P data based on the corresponding P2P interface type. In some embodiments of the present disclosure, a Timing Controller (TCON) board of the active light-emitting display panel 200 is integrated into the system on chip 100, so that the P2P signal may be directly output to the display panel 200 for display.

Of course, in some other embodiments, communication and transmission between the data output unit 50 and the active light-emitting display panel 200 may be implemented by using other interface protocols such as a V-by-One (VBO) protocol, an Embedded DisplayPort (eDP) protocol, or a Low-Voltage Differential Signaling (LVDS).

In the above embodiments, each embodiment is described with its own emphasis. For parts that are not described in detail in a certain embodiment, please refer to the relevant descriptions of other embodiments. During specific implementation, each of the above units or structures can be implemented as an independent entity, or the above units or structures can be combined in any way and implemented as the same or several entities. For the specific implementation of each of the above units or structures, please refer to the previous method embodiments, which is not repeated herein.

As set for above, a system on chip and a display device provided by some embodiments of the present disclosure are introduced in detail. Specific examples are used herein to illustrate the principles and implementation methods of the embodiments of the present disclosure. The descriptions of the above embodiments are only used to help understanding the technical solutions and core ideas of the embodiments of the present disclosure. Those of ordinary skill in the art should understand that the technical solutions recorded in the foregoing embodiments may be modified, or some technical features therein may be equivalently replaced. However, these modifications or replacement do not cause the essence of the corresponding technical solutions to depart from the scope of the technical solutions of the embodiments of the present disclosure.

What is claimed is:

1. A system on chip for connection with an active light-emitting display panel, comprising:
   a shared storage unit configured to store image sampling data, display configuration data, and optical compensation data;
   a micro-processing unit connected to the shared storage unit, wherein the micro-processing unit is configured to receive a control signal and output a control instruction in response to the control signal to trigger enablement of the shared storage unit, the control instruction comprising one of a display instruction and a calibration instruction;
   a display calibration unit connected to the micro-processing unit, wherein the display calibration unit is configured to, in response to the calibration instruction, obtain the image sampling data in the shared storage unit to perform a compensation computation operation and generate the optical compensation data; and
   an image processing unit connected to the micro-processing unit, wherein the image processing unit is configured to, in response to the display instruction, obtain the display configuration data and the optical compensation data in the shared storage unit to perform a picture compensation operation.

2. The system on chip according to claim 1, wherein the shared storage unit comprises at least one random access memory connected to the micro-processing unit, and
   the micro-processing unit is configured to release the random access memory when the display calibration unit finishes the compensation computation operation or when the image processing unit finishes the picture compensation operation.

3. The system on chip according to claim 2, wherein the shared storage unit further comprises a non-volatile memory, and the non-volatile memory and the random access memory are respectively connected to the micro-processing unit;
   the non-volatile memory is configured to store the image sampling data, the display configuration data, and the optical compensation data; and
   the micro-processing unit is configured to retrieve the display configuration data into the random access memory when receiving a display control signal and to retrieve the optical compensation data into the random access memory when receiving a calibration control signal.

4. The system on chip according to claim 3, wherein the non-volatile memory comprises a first storage area and a second storage area, and
   the display configuration data is stored in the first storage area, and the image sampling data and the display configuration data are stored in the first storage area and the second storage area.

5. The system on chip according to claim 1, wherein the control signal comprises a display control signal and a calibration control signal, and
   the micro-processing unit is further configured to receive one of the display control signal and the calibration control signal, and output a display instruction in response to the display control signal or output a calibration instruction in response to the calibration control signal.

6. The system on chip according to claim 5, wherein the display control signal and the calibration control signal are mutually exclusive control signals.

7. The system on chip according to claim 1, wherein the display calibration unit is further configured to receive the image sampling data and generate the optical compensation data based on the image sampling data and a preset compensation algorithm.

8. The system on chip according to claim 1, further comprising a compensated data extraction unit connected to the micro-processing unit,
   wherein the compensated data extraction unit is configured to:
     receive initial picture data in response to the display instruction,
     perform the picture compensation operation based on the initial picture data, the display configuration data, and the optical compensation data to generate compensated picture data, and
     send the compensated picture data to the active light-emitting display panel for display.

9. The system on chip according to claim 8, wherein the image processing unit comprises an image quality enhancement unit connected to the micro-processing unit, and
   the image quality enhancement unit is configured to superimpose image quality enhancement data to the compensated picture data in response to a received image quality enhancement trigger instruction.

10. The system on chip according to claim 9, wherein the control signal comprises a display control signal and a calibration control signal, and the micro-processing unit comprises:
    a first sub-micro-processing unit connected to the shared storage unit, the display calibration unit, and the compensated data extraction unit, wherein the first sub-micro-processing unit is configured to receive the calibration control signal and send the calibration instruction to trigger the enablement of the shared storage unit in response to the calibration control signal; and
    a second sub-micro-processing unit connected to the shared storage unit and the image quality enhancement unit, wherein the second sub-micro-processing unit is configured to receive the display control signal and send the display instruction to trigger the enablement of the shared storage unit in response to the display control signal.

11. The system on chip according to claim 9, further comprising a data output unit connected to the image quality enhancement unit and the compensated data extraction unit, wherein the data output unit is configured to realize communication and transmission between the image quality enhancement unit and the active light-emitting display panel by using a display signal interface protocol.

12. The system on chip according to claim 11, wherein the display signal interface protocol comprises any one of a Point to Point (P2P) protocol, a V-by-One (VBO) protocol, an Embedded DisplayPort (eDP) protocol, or a Low-Voltage Differential Signaling (LVDS).

13. A display device comprising a system on chip and an active light-emitting display panel connected to each other, wherein the system on chip comprises:
   a shared storage unit configured to store image sampling data, display configuration data, and optical compensation data;
   a micro-processing unit connected to the shared storage unit, wherein the micro-processing unit is configured to receive a control signal and output a control instruction in response to the control signal to trigger enablement of the shared storage unit, the control instruction comprising one of a display instruction and a calibration instruction;
   a display calibration unit connected to the micro-processing unit, wherein the display calibration unit is configured to, in response to the calibration instruction, obtain the image sampling data in the shared storage unit to perform a compensation computation operation and generate the optical compensation data; and
   an image processing unit connected to the micro-processing unit, wherein the image processing unit is configured to, in response to the display instruction, obtain the display configuration data and the optical compensation data in the shared storage unit to perform a picture compensation operation.

14. The display device according to claim 13, wherein the shared storage unit comprises at least one random access memory connected to the micro-processing unit, and
   the micro-processing unit is configured to release the random access memory when the display calibration unit finishes the compensation computation operation or when the image processing unit finishes the picture compensation operation.

15. The display device according to claim 14, wherein the shared storage unit further comprises a non-volatile memory, the non-volatile memory and the random access memory are respectively connected to the micro-processing unit;
   the non-volatile memory is configured to store the image sampling data, the display configuration data, and the optical compensation data; and
   the micro-processing unit is configured to retrieve the display configuration data into the random access memory when receiving a display control signal and to retrieve the optical compensation data into the random access memory when receiving a calibration control signal.

16. The display device according to claim 15, wherein the non-volatile memory comprises a first storage area and a second storage area, and
   the display configuration data is stored in the first storage area, and the image sampling data and the display configuration data are stored in the first storage area and the second storage area.

17. The display device according to claim 13, wherein the control signal comprises a display control signal and a calibration control signal, and
   the micro-processing unit is further configured to receive one of the display control signal and the calibration control signal, and output a display instruction in response to the display control signal or output a calibration instruction in response to the calibration control signal.

18. The display device according to claim 13, wherein the display calibration unit is further configured to receive image sampling data and generate the optical compensation data based on the image sampling data and a preset compensation algorithm.

19. The display device according to claim 13, wherein the system on chip further comprises a compensated data extraction unit connected to the micro-processing unit,
   wherein the compensated data extraction unit is configured to:
      receive initial picture data in response to the display instruction,
      perform the picture compensation operation based on the initial picture data, the display configuration data, and the optical compensation data to generate compensated picture data, and
      send the compensated picture data to the active light-emitting display panel for display.

20. The display device according to claim 19, wherein the image processing unit comprises an image quality enhancement unit connected to the micro-processing unit, and
   the image quality enhancement unit is configured to superimpose image quality enhancement data to the compensated picture data in response to a received image quality enhancement trigger instruction.

* * * * *